United States Patent [19]
Petty

[11] Patent Number: 5,362,263
[45] Date of Patent: Nov. 8, 1994

[54] TROLLING AUTOPILOT

[76] Inventor: Ralph E. Petty, 1625 McDonald, NW., Grand Rapids, Mich. 49504

[21] Appl. No.: 858,097

[22] Filed: Mar. 26, 1992

[51] Int. Cl.$^5$ .................................. B63H 25/04
[52] U.S. Cl. ........................... 440/1; 114/144 E
[58] Field of Search ............. 440/1, 6; 114/144 E, 114/144 R

[56] References Cited

U.S. PATENT DOCUMENTS

| | | | |
|---|---|---|---|
| 2,864,990 | 12/1958 | Hill | 114/144 R |
| 3,922,808 | 12/1975 | Rieth et al. | 43/4 |
| 3,927,635 | 12/1975 | Masuzawa et al. | 114/144 E |
| 4,038,528 | 7/1977 | Fowler | 235/150.26 |
| 4,059,064 | 11/1977 | Dickey | 114/144 |
| 4,103,638 | 8/1978 | Fowler | 114/144 |
| 4,225,949 | 9/1980 | Price et al. | 367/96 |
| 4,339,811 | 7/1982 | Bednarz et al. | 367/96 |
| 4,757,481 | 7/1988 | Orr et al. | 367/96 |
| 4,784,624 | 11/1988 | Yoshida | 440/2 |
| 5,041,029 | 8/1991 | Kulpa | 440/1 |
| 5,050,519 | 9/1991 | Senften | 114/144 E |
| 5,127,352 | 7/1992 | Kulpa | 114/144 E |
| 5,129,345 | 7/1992 | Senften | 440/1 |

Primary Examiner—Michael S. Huppert
Assistant Examiner—Thomas J. Brahan
Attorney, Agent, or Firm—Price, Heneveld, Cooper, DeWitt & Litton

[57] ABSTRACT

An autopilot for a vessel for use in combination with a depth finder having a transducer, including a means for setting and storing a desired characteristic to be followed by the vessel, means for measuring the characteristic to be followed by the vessel, and means for storing a signal generated by the measuring means indicative of the measured characteristic. Once received and stored, the measured characteristic is compared to the selected characteristic. Based upon the comparison between the two characteristics, at least one servo motor is actuated to alter the direction the vessel is traveling. A servo motor may be coupled to the helm or to an outboard motor mounted to the vessel. The speed of the vessel may also be controlled based upon a comparison between a measured value and a selected value.

16 Claims, 5 Drawing Sheets

TROLLING AUTOPILOT

FIELD OF THE INVENTION

This invention relates co automatic pilots, and particularly to an autopilot for steering a vessel. The invention is particularly adapted for use in controlling a fishing boat.

BACKGROUND OF THE INVENTION

In sport and commercial fishing, depth finders are often used to determine the depth of schools of fish. The depth finders are also used to provide the fishermen with a sense of the bottom profile so as to pay-out enough line so as to fish just above the water bottom. Such depth or fish finders display only what is beneath the boat as it is steered by the operator.

In addition to the depth finders, many large commercial fishing vessels also use autopilots to steer the vessel along a course or heading. The autopilots automatically steer the vessel in response to signals received from fixed navigational aids such as longshore radio and navigation (LORAN) stations, global positioning satellites (GPS) systems, or magnetic compasses. These navigational aids steer the boat without regard to conditions existing beneath the vessel.

In at least one instance, an autopilot system utilizes a pair of ultrasonic transducers mounted transversely to the keel of the vessel and directed downwardly to transmit ultrasonic pulses and receive return pulses reflected from the floor of the body of water. Time durations between transmitted and corresponding received pulses are measured to determine floor or channel depth below the port and starboard sides of the vessel. The depths are digitally encoded and supplied to a comparator which generates a signal indicating whether deeper water is port or starboard of the vessel. The comparator signal is supplied to a display to instruct the navigator whether to steer port, starboard, or to maintain course to guide the vessel over the deepest portion of the channel. The comparator signal may also be supplied to the rudder servo to automatically steer the vessel over the deepest portion of the channel.

Doppler systems have been used where two or more beams of radiant energy from the vessel are transmitted at an angle to the earth's surface and portions of the energy are received and processed after reflection from the surface of the earth. The radiant wave energy is transmitted from and received at the two stations spaced as far as practical along the longitudinal axis of the vehicle, the beams of radiant energy being directed parallel to each other at right angles to such axis and at a suitable declination. As the vehicle moves over the surface of the earth, any component of motion at right angles to the longitudinal axis causes the frequency of the received energy to deviate from that of the transmitted energy. By measuring and subtracting the frequency shift at the two stations, the resulting difference is proportional to the velocity and direction of rotation of the vehicle about a vertical axis. zero difference indicating no rotation about the vertical axis. The net velocity can be converted into angular motion of the vehicle about a vertical axis by using the known distance between the transducers.

A primary disadvantage with the autopilots relying on fixed navigational aids is that they are designed to track along a specific route. While the surface track of the vessel may be constant, the track of the vessel above the water bottom may be over irregular and extremely varying water depths. For sport and commercial fishing, it is desired that the boat track above a substantially constant water depth which may well indeed have an irregular or circuitous path. While at least two of the above systems utilize ultrasonic transducers, one system is constantly searching for the deepest portion of the channel in which to steer the vessel, while the other is using Doppler or phase shifts in the ultrasonic signals to indicate which way the vessel has moved. Each of the above systems is extremely complicated and requires at least two transducers to perform the task.

SUMMARY OF THE INVENTION

In its broadest form, this invention provides an autopilot for automatically steering a vessel along a path determined by the characteristics of the body of water instead of magnetic or fixed navigational aids.

In one form, the invention is used in combination with a transducer array for sensing a water characteristic such as speed, water temperature and depth, including a means for setting and storing a water characteristic to be followed by the vessel, means for receiving and storing signals from the transducer array indicating a sensed characteristic and a means for comparing the sensed characteristic to the set characteristic. The comparing means generates an output in response to differences between the sensed and the set characteristic which is then forwarded to a means for controlling the vessel. The controlling means includes a servo mechanism coupled to the rudder or propulsion unit used to power the vessel.

The depth sensing portion of the transducer array works in association with a sonar system commonly known as a "fish finder" or "depth finder" consisting of a transmitter/receiver and a transducer or transducer array (commonly known as a tri-ducer).

In another form, the invention is adapted to be used with any sounding system that transmits and receives via an electrical pulse or signal to sense water characteristics such as depth, temperature and speed of vessel through the water. Means are provided for an operator to select and store desired water characteristics for the vessel to follow. Means are also provided for comparing the operator stored characteristics against the sensed characteristics and generating outputs in response to the differences between those characteristics. The invention further includes means for controlling the speed and/or course of the vessel from these outputs through servo mechanisms coupled to the steering and/or propulsion unit used to steer and power the vessel.

In another embodiment of the invention, a sensing circuit receives input from a transducer array providing signals indicative of water depth, water temperature and the speed of the vessel through the water. Each input is received and converted to a digital signal. The operator selects and stores water depth, water temperature and/or speed values to be followed. In operation, the invention compares the received input signals to the operator selected values. If the received signals or values are greater or lesser than the operator selected values, the invention provides an output to one or more servo devices to correct the steering, speed or both of the vessel.

In yet another form of the invention, one or more switches set by the operator indicate a range of values which are to be compared to the sensed values. Another set of switches controlled by the operator indicate which side of the vessel, port or starboard, is closest to the shore-line or warmer water, depending upon whether water depth or water temperature is the primary characteristic to be followed. A third set of switches allows the operator to override the automatic controls and make corrections for wind or current drift.

The advantages provided by this invention include the ability of sport and commercial fishermen to automatically follow, within a specified range, a predetermined water characteristic. Thus, the fisherman may locate his lines along the temperature boundary or a predetermined distance above the water bottom where fish have a tendency to school.

DETAILED DESCRIPTION OF THE PREFERRED EMBODIMENTS

Figure 1:
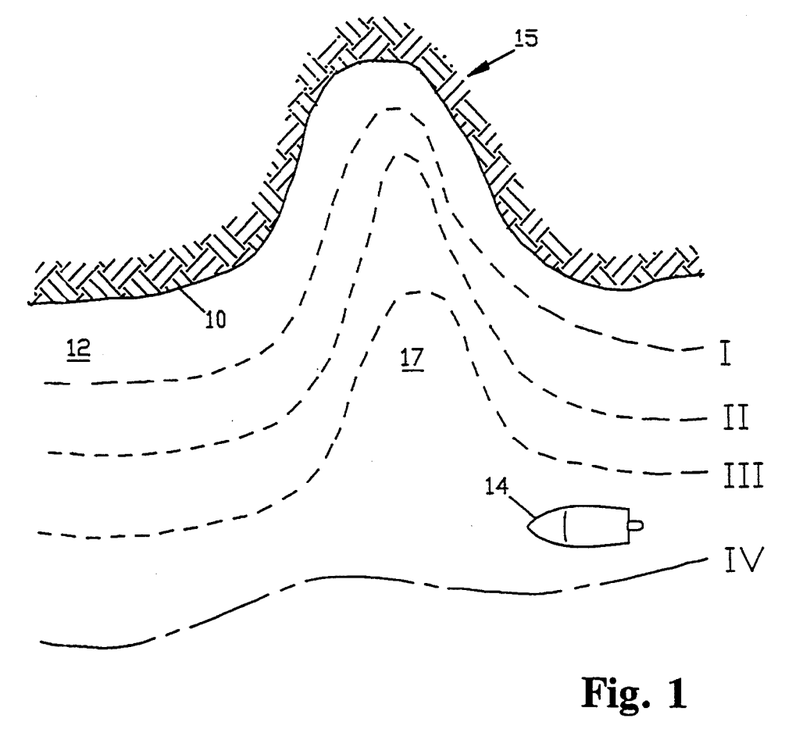
FIG. 1 is a plan view of a vessel in a body of water.

FIG. 1 is a plan view of a shoreline 10 bounding a body of water 12 wherein a boat 14 is traveling from right to left. The physical relief or bottom features of water body 12 are indicated by bathometric contour lines I-III. In FIG. 1, shoreline 10 forms an inlet 15 formed by a canyon or ravine which is continued below the water surface as a canyon 17, illustrated by the closely spaced contour lines I-III. The bottom profile becomes less steep on each side of canyon 17.

Similar to bathometric contours I-III, a body of water may be contoured by water temperature. Isotherm lines, for example as represented by reference IV, may be used to indicate points in water body 12 having the same water temperature. Such isotherm lines are used to designate or distinguish points where temperature changes exist. A physical manifestation of an isotherm line may be represented by a vertical thermocline wherein two bodies of water having different temperatures converge or diverge.

It is well known by sport and commercial fishermen that fish tend to congregate or school at certain water depths, depending upon the season. It is also well known that fish tend to congregate along vertical thermoclines (the boundaries between bodies of water having contrasting temperatures). The instant invention provides an apparatus for use in combination with a vessel and a depth finding device to automatically steer or guide the vessel along a path overlying either a water temperature boundary or along a path having a substantially constant water depth.

Figure 2:
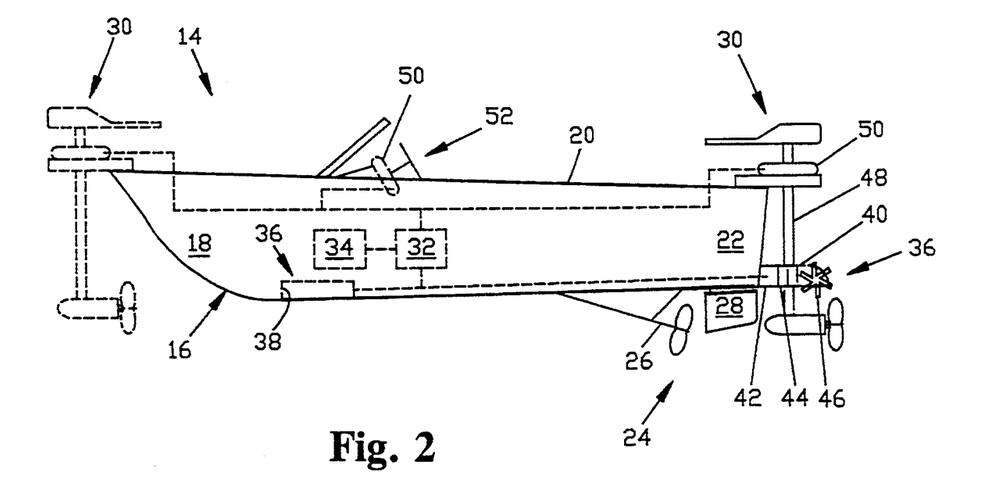
FIG. 2 is an elevational view of a vessel using the present invention.

FIG. 2 is an elevational view of boat 14 wherein the instant invention may be used. Boat 14 includes a hull 16 defining a bow portion 18, gunwales 20, and a stern 22. Boat 14 also includes a steering means 24 such as a motor driven propeller 26 and rudder 28. Often many boats combine the propeller and rudder as a unit, such as in an inboard/outboard motor or the well-known outboard motor. The instant invention may be used in combination with inboard, inboard/outboard, and outboard motors. Since fishing is done at very slow speeds, it is preferred that the instant invention be used in combination with a trolling motor 30 mounted either to bow 18 or to the transom at stern 22. For the purposes of the following description, it will be assumed that trolling motor 30 is mounted to stern 22 using a conventional mounting bracket.

One embodiment of the invention includes a pilot 32 used in combination with a depth finder 34 coupled to a transducer array 36. Transducer array 36 is preferably located below the water line of hull 16 mounted in a recess 38 or to a bracket 40 along the hull exterior. If mounted to bracket 40, it is preferred that transducer array 36 be mounted to stern 22 near the bottom so as to have a protected yet unobstructed scan beneath hull 16. Transducer array 36 may include at least one ultrasonic depth transducer 42 for use in combination with depth finder 34. It is preferred that transducer array 36 also include a temperature transducer 44 suitable for use in often harsh environments and a speed transducer 46 of the paddle or impeller type. Outputs from temperature and speed transducers 44 and 46, respectively, may be input directly to pilot 32 while leads to and from ultrasonic transducer 42 are coupled in parallel to pilot 32 and depth finder 34, discussed in greater detail below.

Mounted about a vertical column 48 of trolling motor 30 is a servo motor 50 adapted to steer trolling motor 30 in response to output signals from pilot 32. In the case of inboard or inboard/outboard motors, servo motor 50 may be mounted to the helm 52 so as to turn the wheel in response to the output signals from pilot 32. In order for servo motor 50 to properly steer boat 14, servo motor 50 should be adequately fastened in place to boat 14. A similar servo motor arrangement may be used in combination with the throttle to control the power settings of trolling motor 30 or pilot 32 may be interfaced with existing autopilot servos or magnetic pilot systems.

As briefly mentioned above, trolling motor 30 may be mounted either to bow 18 or to stern 22. Motor 30 may also be mounted to either the port or starboard side of boat 14 along gunwales 20. It is well known that if trolling motor 30 is mounted to bow 18, its steering characteristics are opposite than if motor 30 were mounted to stern 22. For example, if a left turn is desired, a bow-mounted motor 30 must be turned so that thrust from the propeller is directed toward the right or starboard side of boat 14. For the same left turn, stern-mounted motor 30 must be turned so that thrust is directed to the port or left-hand side of boat 14. Depending on how far forward or aft of the boat's beam, gunwale-mounted motors (not shown) will cause similar results as bow- or stern-mounted motors. However, for motors mounted on the gunwales, a correction angle may be required so that boat 14 may track a course parallel to the keel. The off-axial thrust of the gunwale-mounted motor may cause boat 14 to turn about a point located opposite the side on which the motor is mounted, thus the correction angle is required and may be implemented as provided below.

Figure 3:
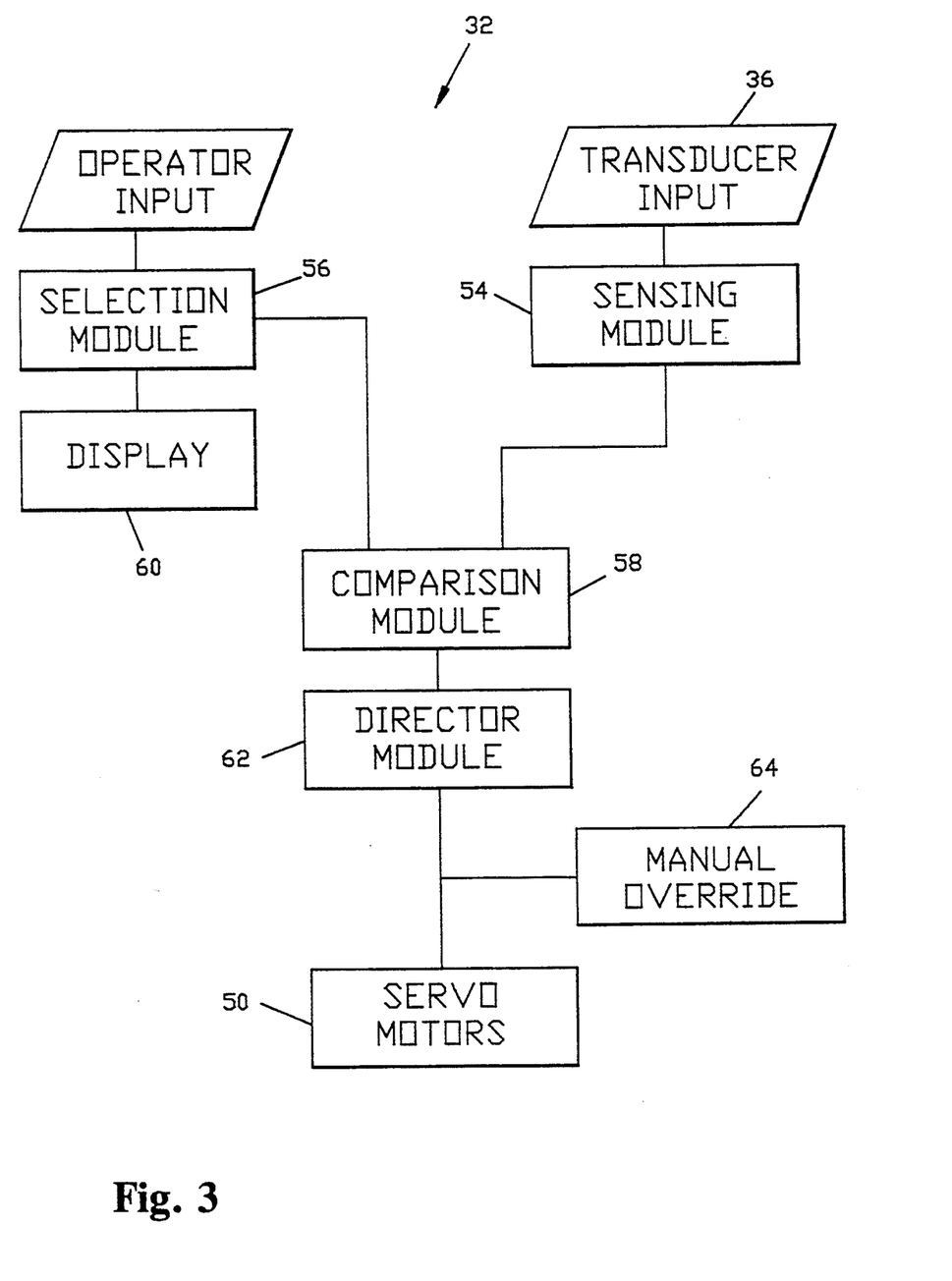
FIG. 3 is a general schematic block diagram of one embodiment of the invention.

FIG. 3 is a general schematic block diagram of one embodiment of the invention. Pilot 32 includes a selection module 56 which receives input from an operator who selects the values pilot 32 is to follow. The values selected by the operator are stored for later reference. Other values may also be preset by the operator, such as the location of the trolling motor, as will be set forth in greater detail below. Pilot 32 also includes a sensing module 54 which receives inputs from transducer array 36. The sensed values and operator selected values are compared by module 58 which issues instructions to director module 62, which in turn issues a signal to servo motor(s) 50 to control the steering and/or speed of boat 14. A display, represented by block 60 provides visual feedback to the operator. Based on the visual feedback, the operator may make adjustments through selection module 54 or may override the system through override module 64.

Figure 4:
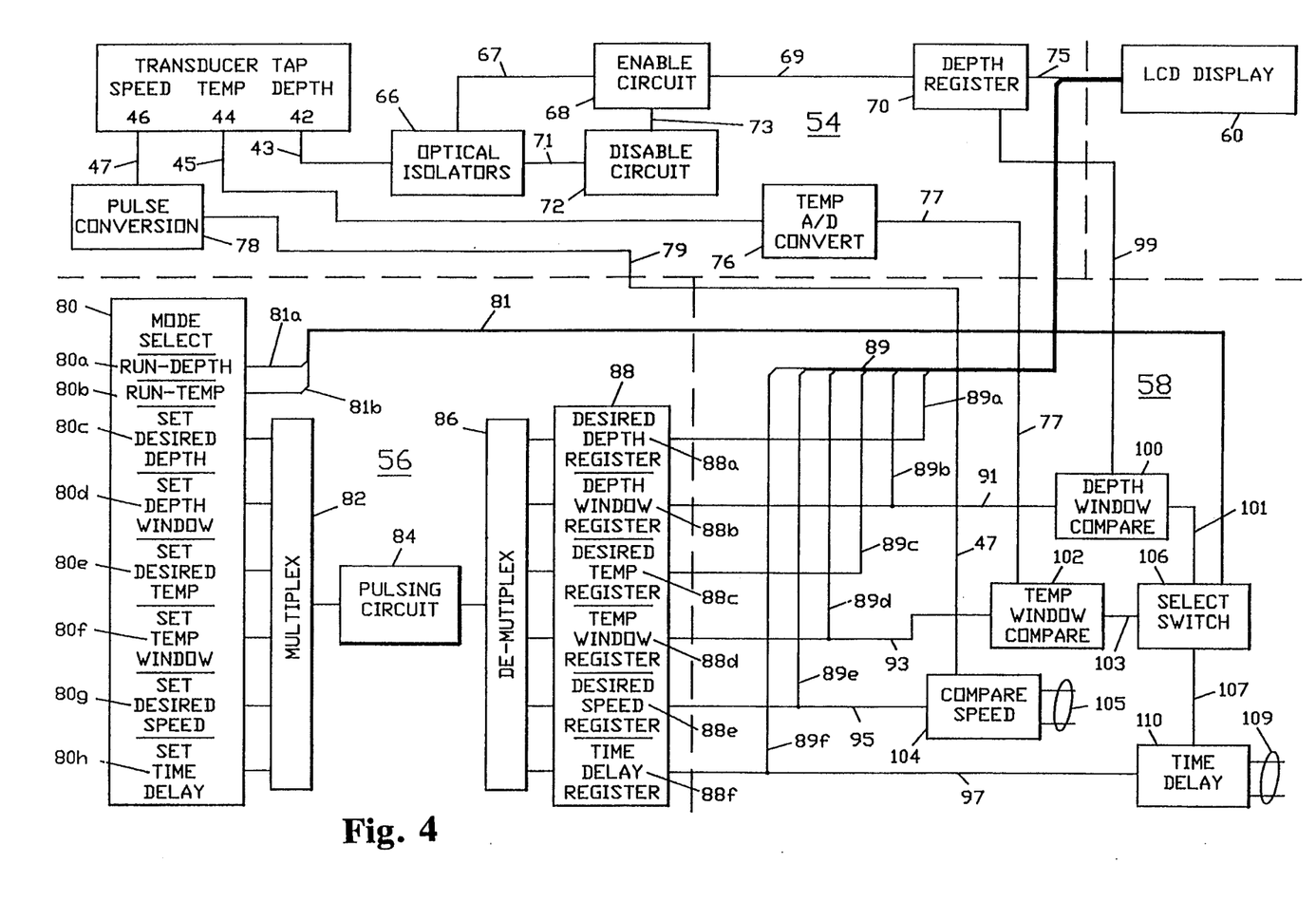
FIGS. 4 and 5 are schematic block diagrams illustrating the components of a preferred embodiment of the invention.
Figure 5:
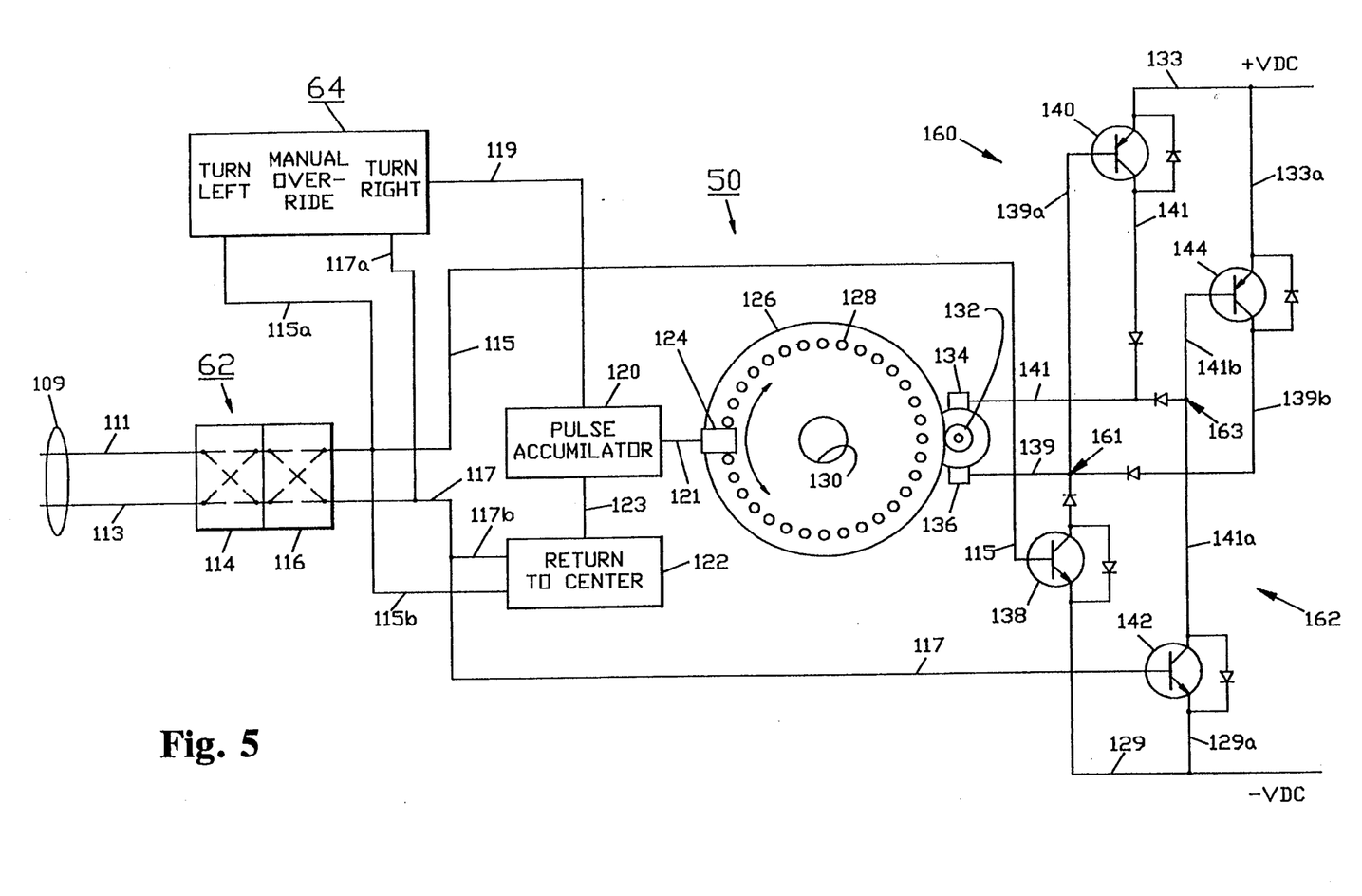

FIGS. 4 and 5 illustrate a schematic block diagram of a preferred embodiment of the invention wherein dashed lines are used to represent sensing module 54, selection module 56 and comparator module 58. Display module 60, director module 62 and servo motor 50 are also shown. Selection module 56 receives inputs from the operator through a switch array 80 used to select mode of operation 80a–80b, water depth 80c, margin or depth window 80f, water temperature 80e, temperature window 80f, boat speed 80g and time delay 80h, before a correction is made. Switches 80c–80h are interconnected through a multiplexer 66 to a pulsing circuit 84 which, in turn, is connected to a demultiplexer 86. Demultiplexer 86 has a plurality of outputs connected to a storage device 88 containing a plurality of addressed locations or registers 88a–88f for storing the selections entered by the operator. Registers 88a–88f each have an output coupled to display 60 through lines 89a–89f. Display 60 shows the value contained in the appropriate register 88a–88f when its respective switch 80c–80h is closed.

Sensing module 54 is adapted to receive signals from transducer array 36, including ultrasonic depth transducer 42 used in combination with depth finder 34 (not shown). Depth transducer 42 may be a conventional piezoelectric transducer, well known in the art. Temperature transducer 44 may be a thermo-resister or the like and preferably sensitive to water temperature changes on the order of one-tenth of a degree. Speed transducer 46 may be of the impeller type adapted to produce an output at slow speeds. All of the transducers 42–46 typically generate signals which are input to sensing module 56.

In order to provide adaptability of pilot 32 to various types of depth finders, the output/input signals are preferably monitored by sensing module 54 through optical isolators 66, segregating the signals coming from depth finder 34 and transducer 42 from the components comprising sensing module 54.

Each output, or electrical pulse, transmitted by depth finder 34 to transducer 42 is a signal of a particular bias which is coupled by optical isolators 66 to enable circuit 68 by line 67. The return signal, or ping, generated by transducer 42 is also received by sensing module 54 through optical isolators 66 to disable circuit 72 by line 71. Each successive output signal from depth finder 34 causes optical isolator 66 to produce a signal to enable circuit 68 which enables depth counter register 70 through line 69. When the depth register is enabled it counts pulses from an oscillator (not shown) running at a predetermined frequency. The return signal (ping) generated by transducer 42 causes disable circuit 72 to interrupt enable circuit 68 through line 73, which in turn causes depth register 70 to stop counting. The count value in register 70 is held until enable circuit 68 is activated again by the appropriate output signal from depth finder 34.

It is well known that the leads on ultrasonic piezoelectric transducers reverse polarity when a pulse is transmitted and received. The optical isolator coupling 66 used to receive the input and output to and from ultrasonic transducer 42 is directionally controlled so that a first optical isolator is activated on an output pulse and a second optical isolator is activated on the return pulse, thus activating and deactivating counter 70.

It is preferred that a fraction of the output pulses actuating ultrasonic transducer 42 be used to activate enable circuit 68. Depth finders generate several pulses per second and only a small number of those pulses are required to initiate corrections. Following this logic, it is preferred that sensing module 54 accept input signals at one-fourth the frequency of signals produced by the sonar system.

Various types of depth finders that may be used with the invention are available on the market. These include liquid crystal display (LCD), video or CRT displays and the flasher-type which has a rotating neon lamp. An example of an LCD-type depth finder is available under the trademark "ECHO 200 ST" and uses a tri-ducer (depth temperature and speed) sensor. Another type, designated "VG800," is a color CRT (video) type unit made by Eagle, of Catoosa, Okla. and also uses a tri-ducer. A flasher-type depth finder is sold under the designations "WPS60" or "HUMMINGBIRD SUPER-SIXTY" produced by Techsonic Industries, of Lake Evfaula, Ala. and has only a transducer for depth. Depending upon whether an LCD, video or flasher system is used in combination with this invention, disable circuit 72 is provided to compensate for the rate at which output pulses are generated by certain such depth finders. For example, flasher-type units generate interrogation or output pulses at a much faster rate than do LCD or video depth finders. Thus, even in moderately deep water the return ping may be received at, or after, the generation of the next output pulse. Because of the overlap of the output pulses and return pulses, depth counter 70 could be disabled prematurely. Disable circuit 72 provides a means for adjustably delaying the signal on line 83 generated by the return used to disable depth counter 70, thus allowing the counter to continue counting from the first interrogation pulse until its receipt of the proper return pulse. The delay provided by disable circuit 72 is manually adjustable for setting by an operator comparing the depth reading on display 60 with the reading on depth finder 34.

Sensing module 54 also receives signals from temperature and speed transducers 44 and 46, respectively. The output of the temperature transducer 44 is an analog signal converted within sensing module 54 to a digital signal by analog-to-digital converter (ADC) 76. The output from ADC 76 is passed continuously to comparison module 58. Received pulses from speed transducer 46 are passed on a continuous basis to pulse conversion circuit 73 and then to comparison module 58.

Comparison module 58 is adapted to compare each input signal from sensing module 54 with the values stored in the addressed register locations of storage device 88. Comparison module 58 includes a plurality of digital comparators, each dedicated to compare the sensed values and set values of one of the measured characteristics. For example, depth comparator 100 receives output from depth register 70 along dataline 99. Comparator 100 also receives input from the output of depth registers 88a–88b providing selected depth range information from storage device 88 along dataline 91. Output from depth comparator 100 is placed on Depth Command Bus (DCB) 101 to select switch 106.

Temperature comparator 102 receives inputs from the output side of ADC 76 along dataline 77 and from temperature registers 88c–88d in storage device 88 along dataline 93. Output from temperature comparator 102 is placed on Temperature Command Bus (TCB) 103 which also terminates in switch 106. The output from either DCB 101 or TCB 103 to switch 106 is placed on Command Bus (CB) 107 operably coupled to time delay circuit 110. Time delay circuit 110 acts essentially as a latch. If a change of state occurs on CB 107, a delay period controlled by a clock or counter (not shown) and set by the value in time register 88f must be satisfied before time delay circuit 110 outputs the change onto Directional Bus (DB) 109.

A third digital comparator 104 is coupled to receive output from pulse conversion 78 along dataline 79 and from speed register 88e along dataline 95. Output from speed comparator 104 is placed directly on Speed Bus (SB) 105, described in greater detail below.

Referring now to FIG. 5, Directional Bus (DB) 109 is interconnected to servo motor 50 by director module 62. Director module 62 includes first and second crossover switches 114 and 116, respectively, each of which reverses the conductor lines 111 and 113 constituting DB 109. Crossover switch 114, designated "high side of boat" switch, is controlled manually by the operator while trolling, indicating whether the starboard or port side of boat 14 is oriented toward shore or shallower water. Crossover switch 116 is similar but is not accessible during normal use. Rather, it is preset during installation to indicate whether trolling motor 30 is mounted to bow 18 or stern 22.

From director module 62, conductor 115 is connected to the base of NPN semiconductor 138 whose emitter is connected to ground (−VDC) through conductor 129. The collector of semiconductor 138 is connected to pole 136 of gear motor 132 by conductor 139. The collector of semiconductor 138 is also connected to the base of PNP semiconductor 140 by conductor 139a running from junction 161. The emitter of semiconductor 140 is made positive (+VDC) through conductor 133. The collector of semiconductor 140 is connected is connected to pole 134 of the gear motor 132 by conductor 141. This Darlington amplifier-type circuit 160 induces rotation of the gear motor 132. For opposite rotation of gear motor 132, a second Darlington amplifier-type circuit 162 is employed. Whereas conductor 117 from director module 62 is connected to the base of NPN semiconductor 142 whose emitter is connected to ground (−VDC) by conductor 129a. The collector of semiconductor 142 is connected to conductor 141 at junction 163 by conductor 141a which continues to the base of semiconductor 144. Semiconductor 144 has its emitter connected to the positive side of the circuit (+VDC) through conductor 133a. Conductor 139b connects the collector side of semiconductor 144 to conductor 139 at junction 161. The two Darlington amplifier-type circuits 160–162 are isolated from each other by diodes.

Figure 6:
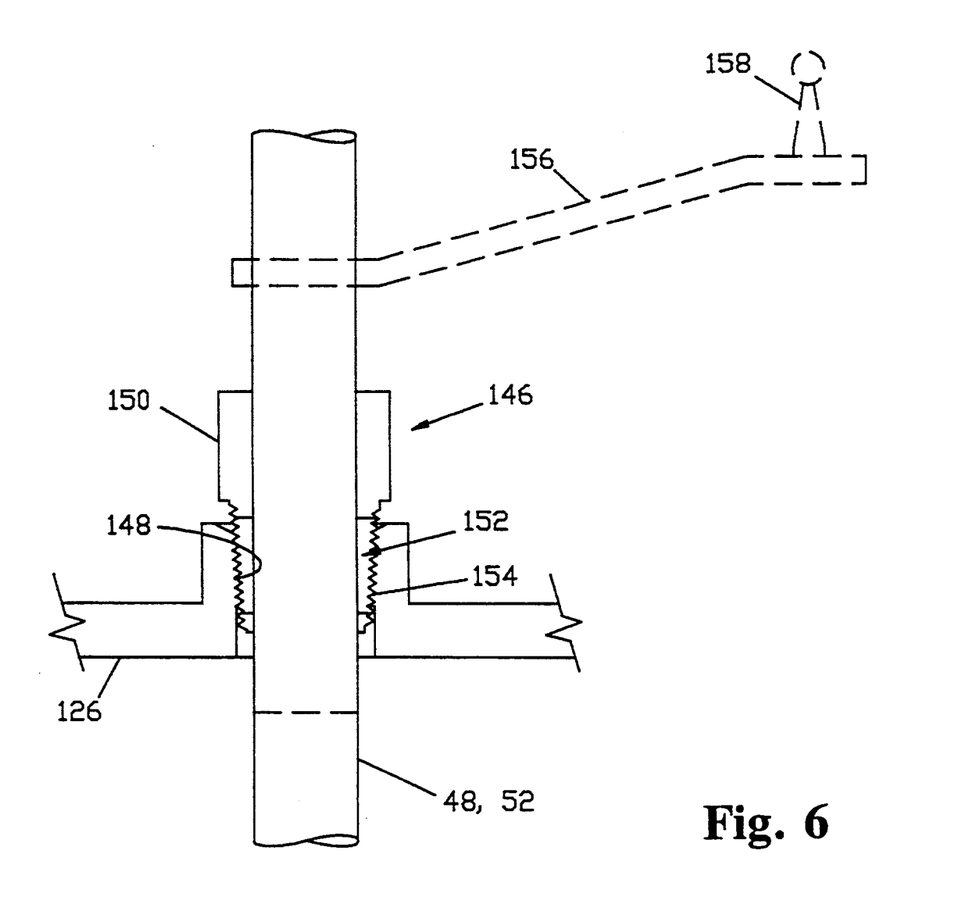
FIG. 6 is an illustration of one embodiment of a mechanical slip coupling between a servo motor and steering means.

Bidirectional motor 132 has a planitary gear array and worm mounted in parallel to its shaft (not shown). worm engages a worm gear 126 henceforth called the "steering gear." Steering gear 126 has a central opening 130 for receiving the column 48 of trolling motor 30 (FIG. 6). In the alternative, opening 130 may receive the shaft of helm 52 or bell crank 156 of FIG. 6. A slip coupling 146, such as shown in FIG. 6, is used to fit the steering gear 126 about the shaft for the helm 52 or column 48 of trolling motor 30. Steering gear 126 is preferably a bronze worm gear having a threaded concentric hole 130 adapted to receive column 48 of trolling motor 30, bell crank 156 or the shaft of helm 52. In order for steering gear 126 to be secured to either shaft, a plastic collet 150 having a tapered threaded portion 152 is received about either shaft to engage threads 148. Threading of collet 150 tightly with threads 148 causes collet fingers 154 to tightly grip the received shaft. The coupling between a shaft, such as 48, and collet 150 is such that the operator could, in an emergency, manually steer to effectively override pilot 38.

The steering gear 126 has a plurality of magnets 128 (FIG. 3) located around its periphery and positioned to pass under a "hall effect" switch 124. Hall effect switch 124 is output through line 121 to a bidirectional counter (not shown) in pulse accumulator circuit 120. The potential of line 115b or line 117b through return to center circuit 122 determines the direction of the count. When the potential on line 115b or 117b goes low, return to center circuit 122 outputs on line 115b or 117b to change rotational direction of motor 132 until pulse accumulator 120 returns to neutral.

Connected in parallel with conductor lines 115 and 117 are lines 115a and 117a, respectively, extending to manual override switch 64 which is capable of receiving user input commands to allow the operator to override the automatic steering commands. Manual override switch 64 is connected to conductors 115 and 117 after crossover switches 114 and 116 of director module 62.

In operation, pilot 32 is installed in boat 14. If an electric line trolling motor is being used, servo motor 50 is mounted about motor column 48 and held tightly therewith by slip coupling 150 or the like sufficient to assure a good connection between the interior of steering gear 126 and the trolling motor column 48. If a large outboard motor is being used, or an inboard motor, servo motor 50 is mounted over the steering shaft of helm 52 using the same or similar coupling. If desired, for outboard motors, a bell crank 156 (FIG. 6) may be fixed within steering gear 126 with an end 158 of bell crank 156 fastened to the steering yoke of the outboard. Crossover switch 116 is set at the time pilot 32 is installed to indicate whether the trolling motor is located forward or aft on boat 14.

To use autopilot 32, the operator determines what mode (temperature or depth) to track on. The selection can be changed at any time. For example, if depth is to be used, the operator depresses switch 80c (down) in order to incrementally index up to the desired positive value indicating increasing depth. Multiplexer 82 connects switch 80c (down) to pulsing circuit 84 in order to cause depth register 88a to scroll through to the desired setting. Release of switch 80c sets and stores the desired value in the depth register 88a. The depth window is set next with a minimum value of (+) and (−) three inches of setting in depth register 88a. To set the window, the operator presses depth window switch 80d which is multiplexed through pulsing circuit 84 to window register 88b. Indexing of window register 88b subtracts the indexed value from depth register 88a and adds the indexed value to window register 88b, establishing a maximum and minimum depth.

Transducer array 36 and each of the transducers 42–46 thereon produce an output at a preset rate. For example, speed and water temperature signals are output continuously to sensing module 54. Water temperature sensed by transducer 44 is converted from analog signals to digital signals by ADC 76 before being sent to temperature window comparator 102. Speed input is converted and passed to speed comparator 104.

Upon receipt of the appropriate output pulse from the depth finder to transducer 42, enable circuit 68 activates depth counter 70 which receives input pulses from a clock. Upon receipt of the return pulse or ping from transducer 42 to the depth finder, disable circuit 72 disables both enable circuit 68 and depth counter 70 with the measured clock value held as a representation of the measured water depth. Output from counter 70 is compared by comparator 100 with the upper and lower values stored in depth registers 88a–88b. If the value measured is between the upper and lower values, no output is generated by comparator 100. If the measured value is greater than the deepest value, a signal is output along DCB 101 to switch 106. Assuming the operator has elected to track a substantially constant water depth through mode select switch 80a, switch 106 outputs a signal onto CB 107 which is input into time delay circuit 110 to initiate the running of the delay period. If the input signal is still present on CB 107 at the end of the delay period, the signal is output onto one of the conductors in DB 109. Depending on the setting of director module 62, either line 115 or 117 will be high. For example, if line 115 goes high, semiconductor switches 138 and 140 close, connecting lines 133 and 141 to the positive terminal of the power supply while lines 129 and 136 are coupled to the negative terminal. In the alternative, if line 117 goes high, semiconductor switch 142 closes, drawing down and closing semiconductor switch 144 through line 146. With semiconductor switches 144 and 142 closed, lines 133a and 139b are connected to the positive terminal while lines 129a, 141 and 141a are connected to the negative terminal. It is axiomatic that while one Darlington amplifier pair 160 or 162 is on, the other pair is off. Depending upon the state present on lines 115 and 117 after director module 62, gear motor 132 is activated in either direction to rotate steering gear 126. Hall Effect switch 124 measures the rotation of steering gear 120 and is accumulated on counter 120 When the count in either direction is exceeded, pulse accumulator 120 outputs a signal to controller 122 which disables gear motor 132. After line 115 or 117 has gone high and then returns to a low state, return to center circuit 122 outputs on lines 115b or 117b opposite their previous state to reverse gear motor 132 to return trolling motor 30 to its neutral or return position.

The automated steering of trolling motor 30 may be manually overridden by MOR module 64 which includes two switches, one for left and one for right. MOR 64 is connected to gear motor 132 and to controller 122. The operator may use either switch to manually steer the vessel or make a greater turn than pilot 38 initiated. Each time MOR 64 is activated, accumulator 120 is reset to zero. This allows corrections to be made for wind or water currents.

If water temperature is the value to be followed, the operator selects that mode through mode select switch 80b, which is connected to switch 106 by line 81b. Setting of mode switch 80b to "run temp" disables the output on DCB 101 from depth comparator 100 and enables the output along TCB 103 from temperature comparator 102.

A vertical thermocline may manifest along the water surface by a visually different texture of the waves or wavelets. The water surface may be rough on one side of the thermocline and smooth on the other side. During the warmer months, insects may tend to congregate along the boundary to form a "bug line." The insects are believed to be feeding on microorganisms present in the water along the boundary. The insects, in turn, are a food source for fish.

To follow a vertical thermocline, the operator first finds the thermocline by observing the water surface, looking for differences in water surface texture or "bug lines." The operator can then traverse the thermocline boundary and observe the water temperature sensed by transducer 44. As the boat traverses the thermocline, the operator can select a temperature value indicative of the mixing zone marking the boundary. The operator then selects and stores the desired value in the appropriate memory registers 88c and 88d through select switches 80e and 80f, multiplexers 82 and 86 and pulsing circuit 84. The value set in registers 88c and 88d may be indexed, scrolled and set in the same way as water depth described above.

The operator also sets director switch 62 to indicate which side of boat 14 is oriented toward warmer water. Comparator 102 compares the output of transducer 44 with the stored values in registers 88c and 88d. If the measured value is greater than the set value, a signal is output on TCB 103 to switch 106. Switch 106 in turn outputs a signal on CB 107 which is passed to time delay circuit 110. The same sequence of events will occur if the measured signal is less than the selected value. Just as with water depth, the operator may set a temperature range through switches 80e and 80f and stored in registers 88c and 88d. A steering correction would not occur unless the upper or lower temperature values were exceeded.

Because temperature transducer 44 senses on a continuous basis, corrections are issued by comparator 102 on a continuous basis to switch 106. Time delay circuit 110 slows directional changes to the delay period established by time register 88f and passed by line 97. As described above with respect to the depth mode, a signal is placed either on line 115 or 117 to control the steering of boat 14 in response to temperature changes sensed by transducer 44.

Speed comparator 104 within comparison module 58 receives input from speed transducer 46 and pulse conversion on a continuous basis over dataline 47. Comparator 104 also receives input from speed register 88e in storage device 88. If the measured speed value is greater than the selected value, comparator 104 outputs a signal on the slow line of Speed Command Bus (SCB) 105. Alternatively, if the measured speed is less than the selected speed, comparator 104 outputs a signal on the fast line of SCB 105. SCB 105 is connected to a servo motor substantially similar to servo motor 50 mechanically coupled to the throttle linkage of boat 14. Provisions may be made for the operator to manually adjust the throttle in case of emergencies. The operator may also slowly adjust the speed by resetting the selected value in speed register 88e through switch 80g.

Pilot 32 may also be equipped with an alarm circuit (not shown) to provide an audible alarm when comparison module 58 receives a signal indicating that one of the measured characteristics has exceeded a predetermined value, for example, a maximum or minimum water depth. The alarm may also be programmed to go off when a particular signal exists on CB 107 for a predetermined period of time, indicating that boat 14 may be located in or over some point where a correction is ineffective.

Although the invention has been described with respect to specific preferred embodiments thereof, many variations and modifications will become apparent to those skilled in the art. For example, the invention may be incorporated to form an integral part of a conventional fish or depth finder. The protection afforded the invention is intended to be limited only to the scope of the appended claims, as interpreted according to the principles of patent law including the doctrine of equivalents.

The embodiments of the invention in which an exclusive property or privilege is claimed are defined as follows:

1. A method of automatically controlling a vessel in response to water characteristics, comprising:
   selecting a value indicative of a water characteristic to be followed and storing said value in a memory device;
   receiving a signal from a sensor measuring the water characteristic to be followed;
   comparing the received signal to the stored values indicative of said water characteristic and generating an output in response to a difference between said received signal and said stored value;
   actuating at least one servo motor coupled to a means for controlling the vessel in response to said difference between said received signal and said stored value; and
   wherein the step of selecting and storing includes selecting a value indicative of water temperature range to be followed.

2. A method as recited in claim 1, wherein said step of selecting and storing further includes selecting a value indicative of a range of speed.

3. A method as recited in claim 1, wherein the step of selecting and storing further includes selecting a value indicative of a substantially constant water depth to be followed.

4. A method as recited in claim 3, wherein the step of selecting a substantially constant water depth further includes the step of selecting upper and lower limits.

5. An apparatus for guiding a vessel along a route determined by a characteristic of the body of water, comprising:
   an input panel for selecting the desired characteristic to be followed by the vessel;
   a memory device for storing the characteristic from said input panel;
   a sensing system for measuring the characteristic to be followed by the vessel;
   a circuit for comparing the measured characteristic to said selected characteristic, said comparing means producing an output indicative of a difference between the measured and selected characteristic;
   a steering device receiving the output from said comparing means, for changing the route of said vessel in response to the output from said comparing means;
   a circuit for indicating a location of said steering device with respect to the vessel; and
   wherein said input panel includes:
   a plurality of switches, at least one for each water characteristic to be set; and
   at least one switch for selecting between each water characteristic set.

6. An apparatus for guiding a vessel along a route determined by a characteristic of the body of water, comprising:
   an input panel having a plurality of switches for selecting the desired characteristic to be followed by the vessel, said panel having at least one switch for each characteristic to be followed;
   a memory device for storing the characteristic from said input panel;
   a sensing system for measuring the characteristic to be followed by the vessel;
   a circuit for comparing the measured characteristic to said selected characteristic, said circuit producing an output indicative of a difference between the measured and selected characteristic;
   a steering device receiving the output from said comparing means, for changing the route of said vessel in response to the output from said comparing means;
   a circuit for indicating a location of said steering device with respect to the vessel; and
   wherein said sensing system includes a plurality of transducers, each responsive to a particular water characteristic.

7. An autopilot for a vessel, comprising:
   at least one detector positioned at a particular location on a vessel for detecting a water parameter;
   at least one input switch for setting said water parameter;
   a processor for receiving a signal from said detector for providing an indication of the manner in which said water parameter varies with respect to said vessel;
   a control responsive to said input switch and said processor for steering said vessel in accordance with said set values;
   wherein said water parameter is temperature; and
   wherein said at least one detector is a temperature sensor.

8. An autopilot as recited in claim 7, wherein said at least one input switch is user operable.

9. An autopilot as recited in claim 7, wherein said water parameter includes depth.

10. An autopilot as recited in claim 7, further including means for indicating whether the shoreline is on a port or starboard side of said vessel.

11. An autopilot for a vessel, comprising:
    at least one detector positioned at a particular location on a vessel for detecting a water parameter;
    at least one input switch for setting said water parameter;
    a processor for receiving a signal from said detector for providing an indication of the manner in which said water parameter varies with respect to said vessel;
    a control responsive to said input switch and said processor for steering said vessel in accordance with said set values;
    wherein said water parameter is temperature; and
    means for indicating whether warmer water is on the port or starboard side of said vessel.

12. An autopilot as recited in claim 11, further including means for controlling a speed of said vessel.

13. An autopilot as recited in claim 11, wherein said control includes a controlled trolling motor.

14. An autopilot as recited in claim 13, wherein said controlled trolling motor includes a servo motor.

15. An autopilot as recited in claim 11, wherein said control includes a controlled helm.

16. An autopilot as recited in claim 11, wherein said at least one input switch includes:
   means for indexing said water parameter; and
   means for storing said water parameter.

* * * * *